United States Patent [19]

Huckenbeck

[11] Patent Number: 4,893,899
[45] Date of Patent: Jan. 16, 1990

[54] ADJUSTABLE CONTROL MECHANISM FOR OPTICAL INSTRUMENTS

[75] Inventor: Claus O. Huckenbeck, Tehachapi, Calif.

[73] Assignee: Bausch & Lomb Incorporated, Rochester, N.Y.

[21] Appl. No.: 181,989

[22] Filed: Apr. 15, 1988

[51] Int. Cl.$^4$ .................................................. G02B 7/02
[52] U.S. Cl. ..................................... 350/255; 350/429; 354/219
[58] Field of Search ............... 350/255, 257, 429, 430, 350/515, 518, 519, 521; 354/219, 223

[56] References Cited

U.S. PATENT DOCUMENTS

| | | | |
|---|---|---|---|
| 3,445,155 | 5/1969 | Sturrock | 350/429 |
| 3,631,786 | 1/1972 | Crapsey, Jr. | 350/429 |
| 4,712,897 | 12/1987 | Crema | 354/219 |

Primary Examiner—Bruce Y. Arnold
Assistant Examiner—Loha Ben
Attorney, Agent, or Firm—Christie, Parker & Hale

[57] ABSTRACT

A control mechanism slidably positions an optical component, such as a focusing lens or a zoom lens, along an optical axis of an optical instrument, such as a telescope or spotting scope. The controller includes a rocker manually rotatable about an axis substantially parallel to the optical axis of the instrument, and an actuating pin rotatably secured to the rocker and extending vertically into the interior of the instrument for actuating a lever arm that reciprocates the optical component. Vertical reciprocating travel of the actuating pin in response to clockwise or counterclockwise rotation of the rocker pivots one end of the lever arm through an angle about a fixed pivot. This rotates a cam on an opposite end of the lever arm through an angle that controls sliding reciprocating travel of the optical component. A drive pin on the optical component is driven by arcuate travel of the cam to slidably position the optical component along the optical axis of the instrument in response to clockwise or counterclockwise rotation of the rocker. In another embodiment, the rocker has pivotally mounted side flaps attached to the rocker by hinge pins. The ends of the side flaps have fixed pins which engage guide slots on the body of the instrument housing. This combination guides angular travel of the side flaps in response to rotation of the rocker.

18 Claims, 3 Drawing Sheets

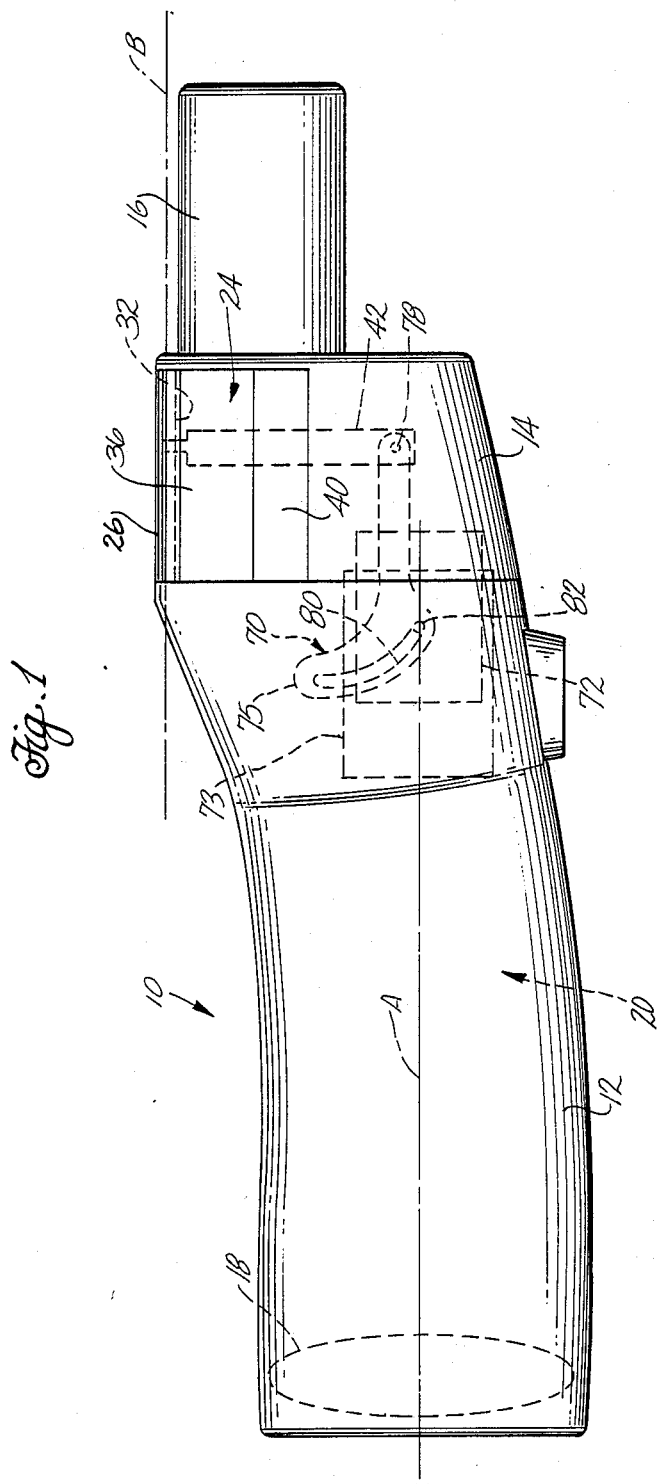

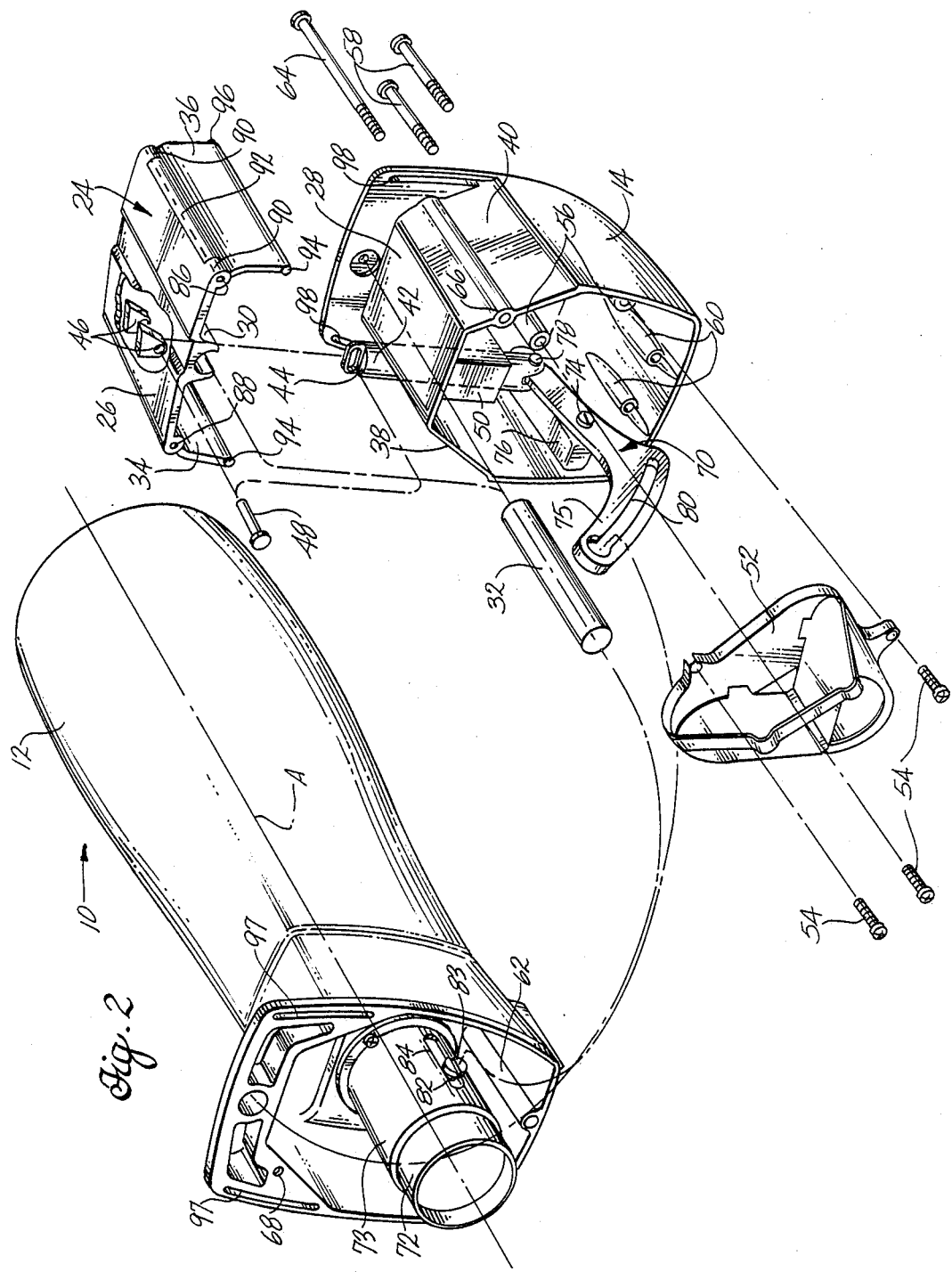

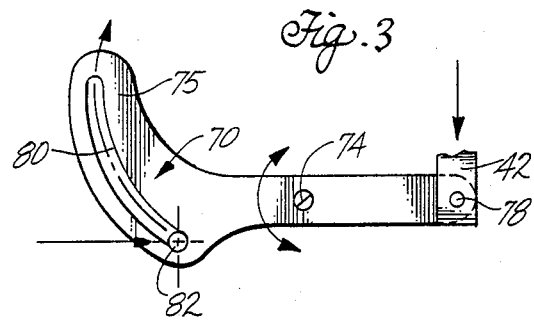
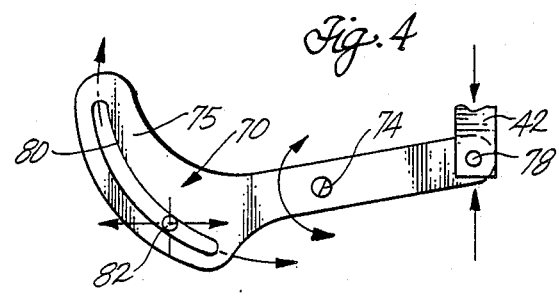
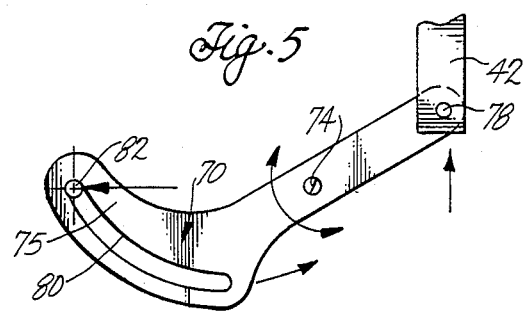

ADJUSTABLE CONTROL MECHANISM FOR OPTICAL INSTRUMENTS

FIELD OF THE INVENTION

This invention relates to optical instruments such as monoculars, including telescopes and spotting scopes, and more particularly, to a control mechanism for positioning components of the optical system along the optical axis of the instrument.

BACKGROUND OF THE INVENTION

Optical instruments such as monoculars, including telescopes and spotting scopes, have means for adjusting the relationship of the components of their optical systems. For typical telescopes, for example, various lens systems are adjustable for movement along the optical axis of the optical system to focus the image to the observer's eye.

Adjustable movement of the eyepiece, for example, may be controlled by a rack and pinion arrangement, or by a screw coupling of the eyepiece to the telescope housing, for example. As to the screw coupling, rotation of a threaded ring displaces the threaded eyepiece and the lens or lenses contained in it for the desired focusing effect. Operation of the rack and pinion mechanism is similar, in that rotation of a ring can rotate the pinion gear to displace the rack which carries the adjustable optical component.

In addition to focusing adjustment, some monoculars, including telescopes and spotting scopes, have a zoom lens system by which optical power of the instrument is adjusted by positioning one of several components of the optical system in relation to each other. As with the focusing adjustment, typical screw threaded or rack and pinion mechanisms are used in which rotation of a ring positions optical components to zoom in on an object.

These controllers can be cumbersome to use and often do not have a fast response time in producing focusing or zooming to the desired sharp image easily and quickly.

There is a need for a control mechanism for adjusting components of an optical system with a fast response time. The control adjustment should quickly and easily produce the desired function, such focusing or zooming, with extreme reliability and accuracy, while holding a sharp image once the optical component is adjusted. It is also desirable for the controller to facilitate external adjustment being made easily with one hand to produce an accurate focus or zoom adjustment with the desired fast response.

The present invention provides an improved controller having these advantages.

SUMMARY OF THE INVENTION

Briefly, one embodiment of the present invention comprises a control mechanism for slidably positioning an optical component along the optical axis of an optical viewing device. The control mechanism includes a rocker externally mounted on the optical viewing device for rotating in clockwise and counterclockwise directions about an axis substantially parallel to the optical axis of the instrument. An actuating pin is movable up or down along an essentially fixed upright axis in response to rotation of the rocker. A lower end of the actuating pin is coupled to an elongated lever arm spaced from the axis of rotation of the rocker. The lever arm has a first end portion on one side of a fixed pivot axis pivotally secured to the lower end of the actuating pin. The first end portion of the lever arm rotates about the fixed pivot axis in response to travel of the actuating pin. A second end portion of the lever, on an opposite side of the fixed pivot axis, has an elongated arcuate sliding connection to a drive pin carried on the optical component. Rotation of the first end of the lever arm about the pivot axis is translated to arcuate rotational travel of the second end portion of the lever arm, for causing sliding reciprocating travel of the drive pin along the optical axis of the viewing device in response to clockwise or counterclockwise rotation of the rocker.

The simple rocking motion of the rocker is translated to a corresponding reciprocating travel of the controlled optical component with a rapid response time. A small displacement of the rocker produces a corresponding wide range of travel of the adjusted optical component, via the coupling of the actuating pin to the lever arm and the lever arm's cam operated connection to the drive pin. The system avoids backlash or other movement tending to cause the image to come out of focus once the adjustment has been made. The controller also is mechanically simple, easy to operate, reliable, and inexpensive to manufacture.

These and other aspects of the invention will be more fully understood by referring to the following detailed description and the accompanying drawings.

BRIEF DESCRIPTION OF THE DRAWINGS

FIG. 1 is a semi-schematic side elevation view illustrating a telescope having an adjustable control mechanism according to principles of this invention.

FIG. 2 is an exploded perspective view illustrating components of the adjustable control mechanism.

FIGS. 3 through 5 are fragmentary side elevation views illustrating different relative positions of the controller lever arm with respect to a drive pin on an optical component adjusted by the controller of this invention.

DETAILED DESCRIPTION

Referring to the drawings, FIG. 1 shows an optical instrument such as a telescope 10. While the following description relates to use of the invention in a telescope, it is understood that the invention can be used equally as well in other monoculars, spotting scopes, telephoto lenses, and the like.

The telescope 10 has an elongated housing which can have various configurations. In the illustrated embodiment, the housing is of multi-piece construction, including a large barrel 12 at one end and a control portion 14 at the opposite end. An elongated eyepiece 16 attaches to the end of the control portion opposite from the barrel. An objective lens 18 is mounted in the end of the barrel opposite from the eyepiece. The observer looks through the eyepiece and receives a magnified image of an object viewed by the objective lens.

A long, hollow interior region 20 within the housing mounts optical components for the instrument. Relative positions of the optical components within the housing are adjusted by the optical control mechanism of this invention. The optical components which are distributed within the housing between the objective lens and the eyepiece are components of the optical system for the telescope, although it is understood that the invention also can be used for adjusting the relative positions of optical components of other optical instruments, and that the optical system described for the telescope 10 is one example only. The optical components distributed between the objective lens and the eyepiece can include further lenses and may also include mirrors or other optical components typically found in telescopes or the like. These components of the optical system define an optical axis A of the telescope.

Referring now to FIG. 2, certain components of this optical system will now be described in relation to the adjustable control mechanism contained principally in the control section 14 of the telescope. As stated previously, the eyepiece 16 can contain one or more lenses (not shown) adapted to magnify the image. Of course it is to be understood that other lenses contained within the telescope along the optical axis A can cooperate with the lenses in the eyepiece to obtain a desired result. To provide focus control, the telescope has a rocker 24 mounted above the control section 14 of the housing. The rocker includes a rotatable focus lever 26 which comprises a flat plate with a slight curvature laterally across the top of the housing section 14. The focus lever is spaced above a top surface 28 of the control section housing 14. An elongated, downwardly opening channel 30 extends along the underside of the focus lever for holding an elongated tubular roll pin 32 which rests on the top surface 28 of the control section housing 14. The channel is open along the bottom to facilitate molding the lever from plastic and for snap-locking the lever onto the roll pin. The focus lever 26 also includes a pair of side flaps 34 and 36 pivotally mounted to the sides of the focus lever. The side flaps extend downwardly at an angle away from the focus lever toward recessed angled side walls 38 and 40 of the housing section 14. Techniques for mounting the side flaps to the focus lever and to the housing are described in more detail below. The roll pin 32 extends along an axis B (see FIG. 1) spaced above and extending substantially parallel to the optical axis A of the instrument. The focus lever 26 can be rotated in clockwise and counterclockwise directions about the axis through the roll pin for providing a focus adjustment for the instrument.

Rotation of the rocker 24 about its axis drives a vertical actuating pin 42. The upper end of the pin is coupled to the underside of the focus lever 26 through a pivot which is spaced apart laterally from the axis of rotation of the focus lever. The pivot includes a recessed upper end portion 44 of the actuating pin 42 which is located between a pair of axially spaced apart brackets 46 affixed to and carried on the bottom of the focus lever. A connecting pin 48 pivotally connects the recessed upper portion 44 of the actuating pin 42 to the brackets 46. Rotation of the focus lever 26 about its axis B causes the fixed brackets to follow the rotation of the focus lever. The actuating pin 42 extends vertically through a pin guide 50 affixed to the inside wall of the housing 14. The pin guide limits the actuating pin to vertical sliding movement within the guide in response to clockwise or counterclockwise rotation of the focus lever. The upper end of the actuating pin pivots about the axis of the connecting pin 48 as the actuating pin moves up or down in the pin guide in response to rotation of the focus lever. The actuating pin is coated with optical grease to dampen its travel in the pin guide. This prevents backlash of the rocker and accurately holds the optical components in a fixed setting during adjustment.

A prism 52 is affixed inside the control section 14 of the housing adjacent the vertical actuating pin 42. The prism is of conventional construction and includes the usual optical components for transferring the image from the optical axis of the objective lens to the optical axis of the eyepiece 16. The prism is rigidly affixed inside the control section 14 of the housing by mounting screws 54 which pass through an exterior mounting plate of the prism and are threaded into corresponding prism mounts 56 in the housing.

The control section 14 of the housing is rigidly affixed to the barrel portion 12 of the housing by elongated mounting screws 58 which pass through guides 60 on the housing section 14 and are screwed into internally threaded mounts 62 inside the barrel. The mounting screws 58 extend into the guides through openings (not shown) on the underside of the telescope housing control portion 14. The control section 14 of the housing also is affixed to the barrel section by an elongated mounting screw 64 passing through a guide 66 and into an internally threaded bore 68 in an end portion of the barrel. Thus, when the telescope housing components are assembled, rotation of the rocker 24 about its axis of rotation reciprocates the actuating pin vertically adjacent to the side of the fixed prism 52.

An elongated lever arm 70 is coupled between the bottom of the actuating pin 42 and an optical component for adjusting the position of the optical component relative to other optical system components of the instrument. The optical component of the telescope illustrated in the drawing is a focusing lens 72, although the position of other optical components can be controlled by the adjustment mechanism of this invention. The focusing lens is movable back and forth in a fixed tube 73 along the optical axis A in response to travel of the lever arm 70.

The lever arm 70 is spaced from and extends in a direction generally parallel to the optical axis A of the instrument. The lever arm is preferably mounted along one side of the housing interior and is adapted to pivot about a transverse axis through a pivot pin 74. The pivot pin 74 extends through the lever arm and into a fixed spacer block 76 on the inside wall of the housing section 14. The rear end portion of the lever arm pivots to the bottom of the actuating pin 42 by a transverse connecting pin 78. Thus, vertical travel of the actuating pin, up or down, causes the rear end portion of the lever arm to rotate through an angle in a vertical plane about the transverse axis through the pivot pin 74.

A front end portion 75 of the lever arm 70 has a cam surface defined by an elongated arcuate cam slot 80 in a portion of the lever arm which extends alongside the focusing lens 72. A drive pin 82 carried on the side of the movable focusing lens engages the cam slot. The drive pin for the focusing lens extends through a guide slot 84 in the fixed housing 73 mounted in the barrel portion 12 of the housing. This guide slot 84 guides axial travel of the drive pin 82 during travel of the focusing lens 72 along the optical axis A of the instrument. The drive pin travels back and forth along the arcuate slot 80 in response to up and down travel of the lever arm 70. The outer end of the drive pin has an enlarged shoulder or head provided by a screw head 83 which holds the pin 82 engaged in the slot 80 during travel of the lever arm 70.

FIGS. 3 through 5 illustrate the full range of motion of the cam portion of the lever arm 70 and the resulting travel of the focusing lens drive pin 82. FIG. 3 illustrates the full extent of the downward travel of the vertical actuating pin 42 which causes the front end portion of the lever arm to rotate upwardly about the fixed axis through the pivot pin 74. This causes the cam slot 80 to rotate upwardly, and this upward rotation forces the drive pin 82 to travel in the slot to the bottom end of the slot. The travel of the drive pin is linear and toward the rear of the instrument housing.

FIG. 4 illustrates an intermediate position of the vertical actuating pin 42 in which the actuating pin has moved upwardly with respect to FIG. 3, or downwardly with respect to FIG. 5, for rotating the lever arm 70 about its axis 74 to an intermediate position. At this point, the drive pin 82 on the focusing lens is at an intermediate position in the cam slot 80.

FIG. 5 illustrates the full upward travel of the actuating pin 42, which causes the front end portion of the lever arm to rotate downwardly about the fixed axis through the pivot pin 74. This causes the cam slot 80 to rotate downwardly, and this downward rotation forces the drive pin 82 on the focusing lens to travel along the slot to the top of the cam slot. The travel of the drive pin continues to the linear and toward the front of the instrument housing.

Thus, vertical reciprocating travel of the actuating pin 42, in response to clockwise or counterclockwise rotation of the focus lever 26, rotates the lever arm 70 about its fixed pivot point and this rotational travel of the lever arm through its cam connection to the drive pin 82 causes corresponding linear reciprocating travel of the focusing lens along the optical axis A of the instrument.

Due to the long length of the cam slot 80 and the leverage provided by the lever arm, a small amount of travel at the focus lever is translated into a much longer focusing distance of the focusing lens travel, resulting in a fast response time when focusing the lens.

In another embodiment of the invention, shown best in FIG. 2, the side flaps 34 and 36 of the rocker are hinged by respective hinge pins 88 and 86 to the outer side edges of the focusing lever 26. Each outer side edge of the focusing lever 26 has a pair of axially spaced apart tabs 90. On each side of the focusing lever the tabs 90 are at the front and rear of the lever. The upper side edge of each side flap has an elongated tab 92 fitted into the space between the tabs 90 at the ends of the focusing lever 26. The hinge pins 86 and 88 extend through the tabs 90 on the focusing lever and through the tabs 92 on the side flaps to hinge the top edge of each side flap to a corresponding outer edge of the focusing lever.

Front and rear guide pins 94 and 96 project axially way from the bottom ends of the side flaps. These guide pins travel in corresponding front guide slots 97 in the housing and in rear guide slots 98 at the rear of the housing.

In use, as the focusing lever 26 is rotated clockwise or counterclockwise about the axis B, the side flaps pivot freely about the axis of the pivot pins 86 and 88 while the guide pins 94 and 96 guide the end travel of the side flaps in the guide slots 97 and 98. This keeps the side flaps in place on the housing to act as dust or rain covers for the mechanism underneath the rocker 24. The guide flaps also provide firm supports for the fingers of the user when the user rotates the rocker during focusing. Further, one guide flap prevents the fingers of the user from coming into contact with the damping grease on the actuating pin 42.

Although the invention has been described in relation to use of the actuating mechanism for adjusting the position of a focusing lens, other optical components such as zoom lenses, objective lenses, or prisms, also can be adjusted in position relative to other components of an optical system using the adjustment mechanism of this invention. Further, the optical components controlled by the actuating mechanism also can include a reticle or filter, for example, which can be superimposed in or removed from the field of view by an appropriate drive system coupled to the actuating mechanism of this invention.

What is claimed is:

1. A control mechanism for slidably positioning an optical component along an optical axis of an optical viewing device, the control mechanism comprising:
   a rocker externally mounted on the optical viewing device and rotatable from an intermediate position in both clockwise and counterclockwise directions about an axis substantially parallel to the optical axis;
   an actuating pin movable up or down along an essentially fixed upright axis in response to rotation of the rocker, the actuating pin having a lower end spaced from its connection to the rocker; and
   an elongated lever arm pivoted on a fixed pivot axis and spaced from the axis of rotation of the rocker, said lever arm having a first end portion on one side of the fixed pivot axis and a second end portion on an opposite side of the fixed pivot axis;
   the first end portion of the lever arm being pivotally secured to the lower end of the actuating pin for rotating about said fixed pivot axis in response to movement of the actuating pin;
   the second end portion of the lever arm having an elongated arcuate sliding connection to a drive pin carried on the optical component, the drive pin being adapted for reciprocating travel along the optical axis of the viewing device, rotation of the first end portion of the lever arm about the pivot axis of the lever arm being translated to arcuate travel of the second end portion of the lever arm about its pivot axis for causing sliding reciprocating travel of the drive pin for slidably positioning the optical component along the optical axis of the viewing device in response to clockwise or counterclockwise rotation of the rocker, the drive pin including means for retaining the sliding connection of the pin to the lever arm during arcuate travel of the second end portion thereof.

2. Apparatus according to claim 1 in which rotation of the second end portion of the lever arm is in a plane spaced laterally from the optical axis for causing said travel of the drive pin.

3. Apparatus according to claim 1 in which the second end portion of the lever arm includes an elongated arcuate cam slot; and the drive pin is engaged with the cam slot for traveling back and forth in the cam slot in response to rotation of the opposite first end portion of the lever arm about said fixed pivot axis, and the means for retaining the drive pin in said sliding connection comprises an enlarged shoulder on the free end of the drive pin for retaining the lever arm between the end of the drive pin and the optical component.

4. Apparatus according to claim 1 in which the optical component comprises a focusing lens.

5. Apparatus according to claim 1 in which the optical component comprises a zoom lens.

6. Apparatus according to claim 1 in which the drive pin is coupled to a reticle to remove or superimpose the reticle in the field of view of the optical viewing device.

7. Apparatus according to claim 1 in which the drive pin is coupled to a filter to remove or superimpose the filter in the field of view of the optical device.

8. An optical instrument comprising:

a housing having a hollow interior, with an optical axis of the instrument extending along the interior of the housing and through an objective lens mounted in the housing;

an optical component slidably movable in the interior of the housing along said optical axis;

a rocker externally mounted on the housing and rotatable from an intermediate position in both clockwise and counterclockwise directions about an axis substantially parallel to the optical axis;

an actuating pin movable up and down along an essentially fixed upright axis in response to rotation of the rocker, the actuating pin having a lower end located in the interior of the housing and spaced from the connection of the actuating pin to the rocker;

an elongated lever arm in the interior of the housing pivoted on a fixed pivot axis and spaced from the axis of rotation of the rocker, said lever arm having a first end portion on one side of the fixed pivot axis and a second end portion on an opposite side of the fixed pivot axis; and means pivotally securing the first end portion of the lever arm to the lower end of the actuating pin for rotating the lever arm about said fixed pivot axis in response to up and down movement of the actuating pin;

the second end portion of the lever arm having an elongated arcuate sliding connection to a drive pin carried on the optical component, the drive pin being adapted for reciprocating travel along the optical axis of the optical instrument, rotation of the first end portion of the lever arm about the pivot axis of the lever arm being translated to arcuate rotational travel of the second end portion of the lever arm, for causing sliding reciprocating movement of the drive pin along the optical axis of the optical instrument in response to clockwise or counterclockwise rotation of the rocker for reciprocally positioning the optical movement along the optical axis relative to the objective lens, the drive pin including means for retaining the sliding connection of the pin to the lever arm during arcuate travel of the second end portion thereof.

9. Apparatus according to claim 8 in which rotation of the second end portion of the lever arm is in a plane spaced laterally from the optical axis.

10. Apparatus according to claim 8 in which the second end portion of the lever arm includes an elongated arcuate groove; and the drive pin is engaged with the groove for traveling back and forth in the groove in response to rotation of the first end portion of the lever arm about said fixed pivot axis, and the means for retaining the drive pin in said sliding connection comprises an enlarged shoulder on the free end of the drive pin for retaining the lever arm between the end of the drive pin and the optical component.

11. Apparatus according to claim 8 in which the optical component comprises a focusing lens.

12. Apparatus according to claim 8 in which the optical component comprises a zoom lens.

13. Apparatus according to claim 8 in which the drive pin is coupled to a reticle to remove or superimpose the reticle in the field of view.

14. Apparatus according to claim 8 in which the drive pin is coupled to a filter to remove or superimpose the filter in the field of view.

15. Apparatus according to claim 8 including a swivel connection between an underside of the rocker and an upper portion of the actuating pin.

16. Apparatus according to claim 8 including a guide affixed in the housing for guiding vertical travel of the actuating pin along said fixed upright axis.

17. Apparatus according to claim 8 including a prism affixed in the hollow interior of the housing, an eyepiece mounted to an end of the housing for viewing the objective lens along an optical path passing through the prism and the optical component; and in which the actuating pin and lever arm extend alongside the prism and the optical component for connection of the lever arm to the drive pin radially extending from the optical component.

18. An optical instrument comprising:

a housing having a hollow interior with an optical axis of the instrument extending along the interior of the housing and through an objective lens mounted in the housing;

an optical component slidably movable in the interior of the housing along said optical axis;

a rocker externally mounted on the housing and rotatable from an intermediate position in both clockwise and counterclockwise directions about an axis substantially parallel to the optical axis;

an actuating pin movable up and down along an essentially fixed upright axis in response to rotation of the rocker, the actuating pin having a lower end located in the interior of the housing and spaced from the connection of the actuating pin to the rocker; and means in the interior of the housing engaged with the lower end of the actuating pin and connected to a drive pin carried on the optical component for causing the optical component to travel along the optical axis in response to clockwise or counterclockwise rotation of the rocker for thereby positioning the optical component relative to the objective lens;

the rocker having side flaps pivotally secured to outer edges of the rocker by corresponding hinge pins so that the side flaps pivot through an angle in response to clockwise or counterclockwise rotation of the rocker, the side flaps further having guide pins at their front and rear lower portions for engaging corresponding guide slots on the housing for guiding the lower portions of the side flaps during their angular travel.

* * * * *

UNITED STATES PATENT AND TRADEMARK OFFICE
CERTIFICATE OF CORRECTION

PATENT NO. : 4,893,899

DATED : January 16, 1990

INVENTOR(S) : Claus O. Huckenbeck

It is certified that error appears in the above—identified patent and that said Letters Patent is hereby corrected as shown below:

Col. 5, line 49, delete "way" and substitute therefor --away--.

Col. 6, line 56, before "first" delete "opposite".

Col. 7, line 46, delete "movement" and substitute therefor --component--.

Signed and Sealed this

Sixteenth Day of July, 1991

Attest:

HARRY F. MANBECK, JR.

Attesting Officer     Commissioner of Patents and Trademarks